United States Patent
Nussbaumer et al.

(10) Patent No.: US 6,212,129 B1
(45) Date of Patent: Apr. 3, 2001

(54) DEVICE FOR MEASURING THE VELOCITY OF A VARIETY OF OBJECTS

(76) Inventors: Marcel Nussbaumer, Hinterfeld 383, CH-4713 Matzendorf (CH); Beat Schönenberg, Chrummatt 3, CH-4612 Wangen/Olten (CH)

(*) Notice: Subject to any disclaimer, the term of this patent is extended or adjusted under 35 U.S.C. 154(b) by 0 days.

(21) Appl. No.: 09/269,254

(22) PCT Filed: Sep. 19, 1997

(86) PCT No.: PCT/CH97/00355

§ 371 Date: May 11, 1999

§ 102(e) Date: May 11, 1999

(87) PCT Pub. No.: WO98/13705

PCT Pub. Date: Apr. 2, 1998

(30) Foreign Application Priority Data

Sep. 23, 1996 (CH) .............................. 1996231/96

(51) Int. Cl.$^7$ .................................................. G01S 15/58
(52) U.S. Cl. ............................................................ 367/89
(58) Field of Search ................................. 367/91, 90, 89

(56) References Cited

U.S. PATENT DOCUMENTS

| | | |
|---|---|---|
| 3,986,182 | 10/1976 | Hackett . |
| 4,035,760 | 7/1977 | Asbury et al. . |
| 4,914,639 * | 4/1990 | Lind et al. .............................. 367/91 |
| 5,012,454 | 4/1991 | Okazaki ................................. 367/89 |
| 5,224,075 | 6/1993 | Iino et al. .............................. 367/91 |
| 5,231,393 | 7/1993 | Strickland . |
| 5,381,384 | 1/1995 | Winje .................................... 367/89 |
| 5,402,393 | 3/1995 | Konrad .................................. 367/89 |
| 5,483,499 | 1/1996 | Brumley et al. ........................ 367/89 |
| 5,502,558 | 3/1996 | Menders et al. ..................... 356/28.5 |
| 5,561,641 | 10/1996 | Nishimori et al. . |

FOREIGN PATENT DOCUMENTS

| | | |
|---|---|---|
| 656 009 A5 | 5/1986 | (CH) . |
| 0 424 704 A2 | 2/1991 | (EP) . |
| 0 625 716 A2 | 11/1994 | (EP) . |
| 1 517 602 | 7/1978 | (GB) . |
| 92/06389 | 4/1992 | (WO) . |

* cited by examiner

Primary Examiner—Daniel T. Pihulic
(74) Attorney, Agent, or Firm—Brown & Wood, LLP

(57) ABSTRACT

The proposed velocity-measuring device (1) can measure the velocity of a wide range of objects via simple sound waves utilising the Doppler-effect principle. The velocity-measuring device (1) consists of a base unit (10) with a command-display unit (17). The base unit (10) holds a sound wave emitter with no less than one loudspeaker (8), a sound wave receiver with no less than one microphone (9), a computing unit and a display screen. In order to measure velocities the device (1) shall be placed next to the projected object line of movement in such a way that the sound waves and the line of movement meet at an acute or obtuse angle. The sound waves striking the followed object shall be partially reflected and subsequently received by the microphone (9) of the receiver. The difference between the emitting frequency and the echo frequency shall be analysed within the computing unit, producing the object velocity. The calculated velocity shall be shown via the control-display unit (17).

12 Claims, 4 Drawing Sheets

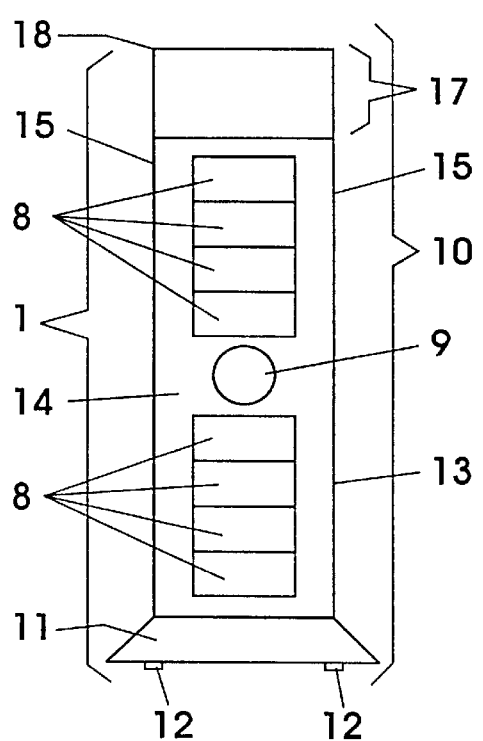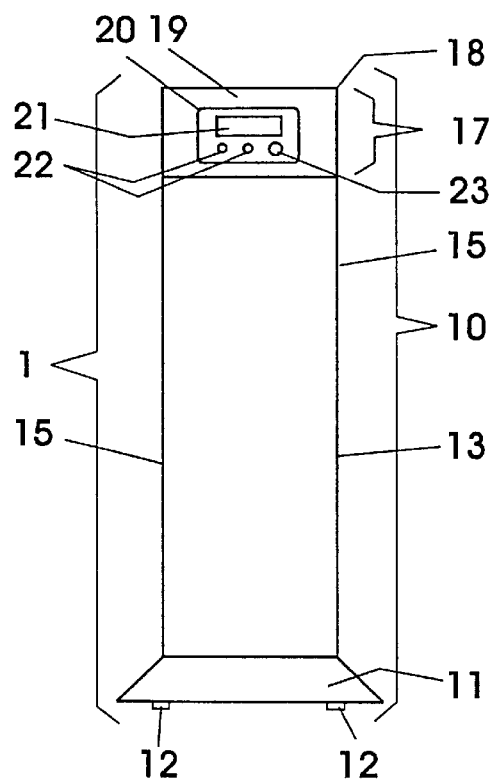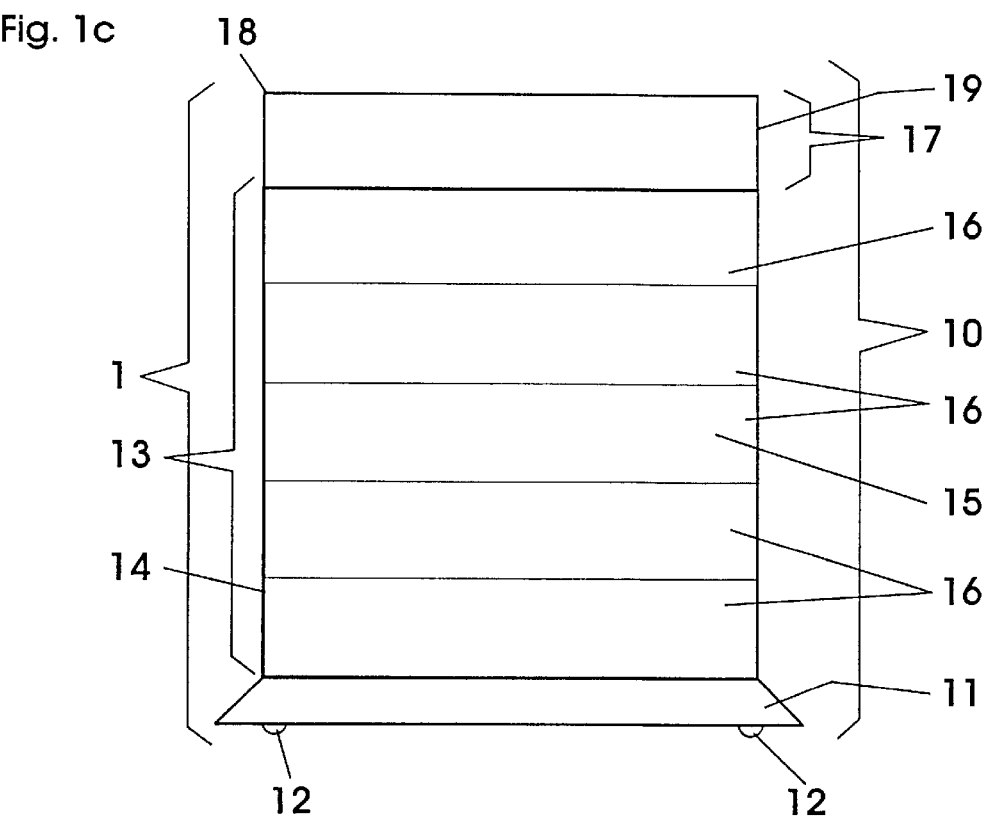

DEVICE FOR MEASURING THE VELOCITY OF A VARIETY OF OBJECTS

Figure 2A:
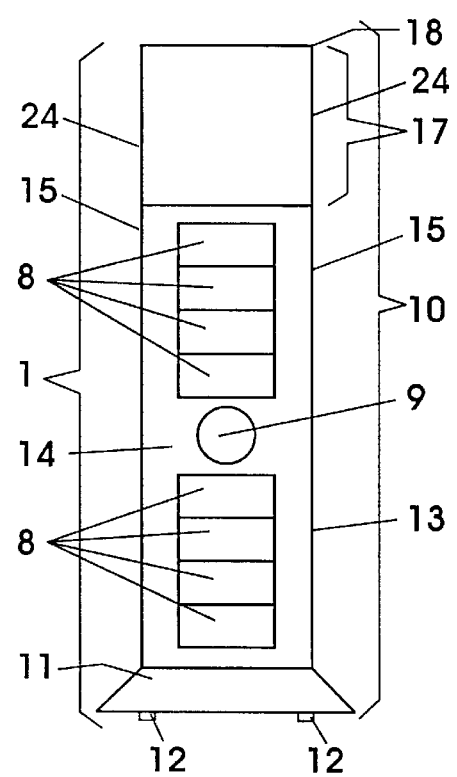

The invention at hand concerns a multipurpose velocity-measuring device as specified in the patent specification 1.

A variety of usage areas, such as air and road traffic control, a broad spectrum of industries and sports are faced on a daily basis with the necessity of measuring the velocity of moving objects.

Navigation requirements of air traffic control and road traffic speed surveillance are often met through use of Doppler-effect radar devices. These devices operate on the basis of electromagnetic radiation, and commonly consist of an emitter, a receiver, and a display; the electromagnetic waves emitted by the device are formed into a club-shaped radiation field via the parabolic reflectors and directed at the chosen area of measurement. Objects traversing this area reflect the waves striking their surface, so that a fraction of the emitted energy returns to the receiver antenna. The receiver subsequently amplifies the returning signals into measurable electric impulses and forwards them to the display unit, usually a screen. By comparing the frequency of the original signal with the frequency of the Doppler-modified echo the device is able to determine the state of movement (velocity and direction) of the followed object. An example of a Doppler-effect radar device and the appropriate measurement technique are described in the patent specification EP 0 424 704 (published May 2, 1991). Measuring devices of this type provide highly accurate results but remain prohibitively costly.

Optical velocity-measuring devices and techniques are also known. The patent specification CH 656 009 (published May 30, 1986) suggests a measurement technique relying on directing measuring rays towards the object tracked via optic impulses; the rays reflected by the moving object are then received and analysed. The time of passage between the device and the object and back is subsequently analysed and transformed into distance, distance change, and velocity values. The major disadvantage of this measurement principle is the analysis-driven necessity for considerable computing power within the measuring device.

Further of note are laser-based velocity-measuring devices operating on the Doppler-effect principles. Laser-based devices are currently under patent procedures U.S. Pat. No. 5,502,558 (published Mar. 26, 1996) and WO 92/06389 (published Apr. 16, 1992).

Both the optical and the laser-based velocity-measuring devices are technically reliant on strongly focused measurement rays and are therefore not suitable for small, relatively distant objects. The followed object must also possess surface areas conducive to optimal reflection of optical impulses and laser beams. Owing to the above-mentioned technical limitations, neither of these measurement devices and principles is suitable for extended usage in ball sports.

The patent procedure EP 0 625 716 (published Nov. 23, 1994) further describes a surveillance device aimed at determination of movement attributes of objects based on no less than two cameras featuring light-sensitive measurement fields. The followed object is marked with several contrast areas; the light emitted by these areas is captured in the camera measurement fields and further analysed. This method provides data on the direction, speed, and spin of the object. On the negative side the device is sizeable and accordingly expensive, and the entire operation with no less than two measuring cameras is unwieldy and cumbersome. In addition, the followed object must be carefully marked with appropriate contrast areas.

Further velocity-measuring devices and procedures based on sound wave techniques are also known. Such acoustic measuring devices detect speed via analysis of sound waves' time of passage. Devices of this type are currently under patent procedures U.S. Pat. No. 5,012,454 (published Apr. 30, 1991) and U.S. Pat. No. 5,402,393 (published Mar. 28, 1995). Both devices are extremely limited in their ranges of potential usage. The device described under patent U.S. Pat. No. 5,012,454 is only applicable to velocity measurement of objects moving in a linear fashion, whereas the device U.S. Pat. No. 5,402,393 may only be applied to velocity measurement of water-based vehicles.

Also known are acoustic velocity-measuring devices determining object speed via phase displacement of sound waves. A procedure based on this principle is described under patent procedure U.S. Pat. No. 5,381,384 (published Jan. 10, 1995). It is only suitable for the determination of vertical velocity of underwater vehicles.

Further of note are acoustic velocity-measuring devices determining the speed of a moving object via Doppler effect phase displacement. Devices of this type are described under patent procedures U.S. Pat. No. 5,224,075 (published Jan. 29, 1993) and U.S. Pat. No. 5,483,499 (published Jan. 9, 1996). The device mentioned in U.S. Pat. No. 5,224,075 is designed for measurement of velocity of water currents. It consists of two instruments—one measures the velocity via the analysis of phase displacement, whereas the other utilises ultra-sound signal frequency displacement. The device is equipped with a switch for instrument selection. The negative sides are its complexity and according high costs.

Another complex and unwieldy device is described under patent procedure U.S. Pat. No. 5,483,499. It is designed to create water stream profiles of high space-time resolution, and operates via a pulsing, phase-coded acoustic signal.

The patent procedure 1 may be generically traced to the principles of the device registered under U.S. Pat. No. 4,035,760. This measuring device is of an exceedingly complex structure, utilising several oscillators, an impulse- or peak generator and a number of saw-tooth generators in addition to a cathode ray tube. The emitter of this device is coupled to an equally complex signal modifier which is also capable of receiving sound waves reflected from the followed object. The velocity of movement of a given object is vertical to the wave front.

An example for sports applications of velocity measurement is usage in football training, particularly training goals such as an improvement of sprinting velocity, jumping power (crucial for headers), stamina, shot accuracy and velocity. Shot velocity is the most difficult measurement to execute in training circumstances. Shot velocity in this example means the speed of flight of the kicked ball. It is also a good indication of the distance of the kick. It is of crucial importance for goal shots—the higher the velocity, the less chances for a successful save by the opposing goalkeeper and the greater possibility of scoring. Shot velocity is a factor of the power of the kick. A goal-oriented exercise program aimed at enlarging the entirety of the leg musculature is an optimal way for increasing this power. It is of paramount importance that the sportsman has the possibility of keeping his increases in efficiency under constant surveillance—this is the sole way of ascertaining whether the training method being used is optimal for his training goals. Should the hoped-for training results not materialise he has the options of increasing training intensity or changing the training method. Thus, constant measuring of efficiency increase—or lack of it—is the only way to ensure best possible training circumstances.

According to the present developments on the technical field, the following possibilities for measuring the shot velocity of the ball exist:

It is well known that the shot velocity may be measured indirectly via the shot distance measurement. However, this process is extremely inaccurate—the shot distance does not depend only on the shot velocity but also on the angle of the kick. Additionally, this process is slow, for the ball must be brought back to the kick-off point after every shot, creating long, unproductive pauses.

Measuring devices based on the principle of light barriers are another viable possibility. These devices consist of a pair of vertical, rectangular frames positioned parallel to each other at a preordained distance. In the vertical props of the frames, spaced regularly above each other, rest series of light barriers. The space between two barriers is somewhat smaller than the diameter of a football, ensuring that a ball traversing the position of the frame passes through at least one barrier. The shot velocity is measured by analysing the time the ball needs to pass the distance between the two frames. The main disadvantages of this method are its cumbersome installation and high price. Another possibility presents the usage of Doppler-effect radar devices. This solution was applied at the Football World Championships of 1990 in Italy. However, the retail price of a radar device of this type comes out to approximately one million Swiss Francs. The device is well-suited to the measuring of ball velocity, but the price far exceeds the possibilities of most single clubs.

High velocities are of paramount importance in other sports as well—examples Of tennis or ice hockey spring to mind—and an optimal velocity-measuring device would be most useful in their training practices.

A practical, simple, yet cost-effective multipurpose velocity-measuring device applicable to various sports needs is currently not known.

The goal of the invention is therefore the creation of a practical and cost-effective multipurpose velocity-measuring device.

This goal may be reached via usage of the device described under patent procedure 1. Further advantageous developments of this device are the subject of dependent claims.

The suggested device measures the velocity of a variety of objects via simple sound waves utilising the Doppler-effect principle. The device consists of a base unit with command—and display units. The base unit consists of a sound wave emitter (tone generator) with at least one speaker, a sound wave receiver with no less than one microphone, a calculating unit, and, if needed, a display screen. Velocity measuring is achieved by placing the device near the expected line of movement of the object in such a way that the sound waves and the moving object intersect each others' paths in an acute or obtuse angle. Sound waves striking the object are partially reflected and received by the microphone receiver. The movement of the object modify the frequency of the reflected sound waves. As the object approaches the measuring device, the wavelength is reduced and the frequency rises. Likewise, as the object moves away from the device, the wavelength grows and the frequency sinks. The difference between the emitted frequency and the echo enables the device to calculate accurately the speed of the object. Measuring is effected within a particular zone whose form and size depend on the output power of the sound wave emitter and the emitting angle of the loudspeaker.

Figure 2B:
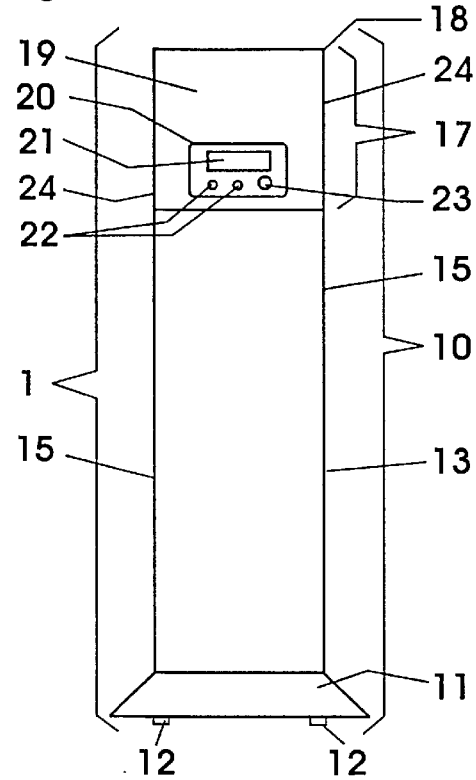
Figure 2C:
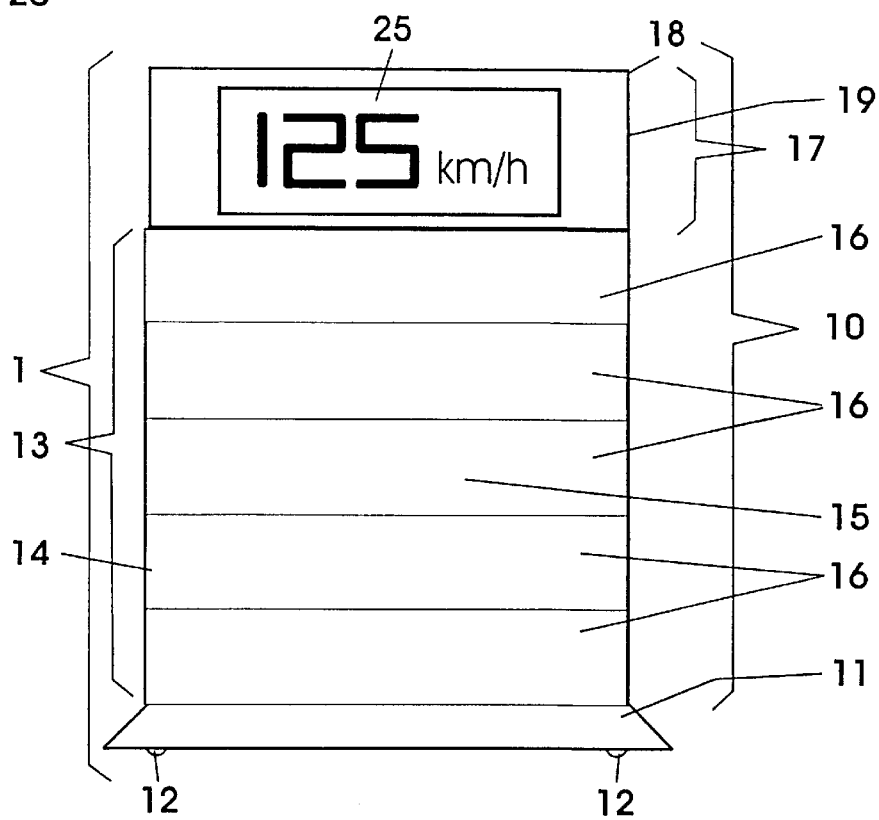
Figure 3:
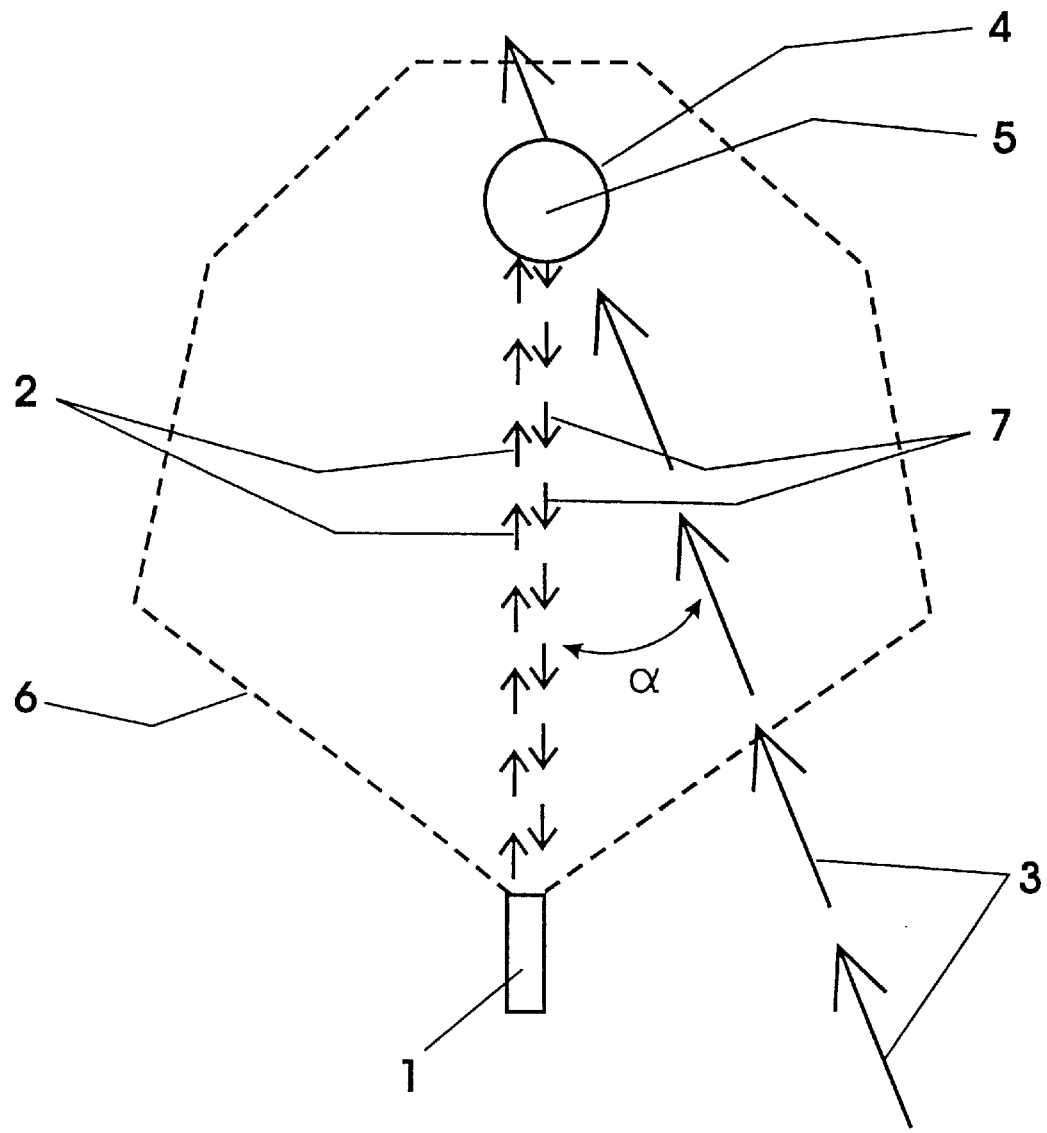
Figure 4:
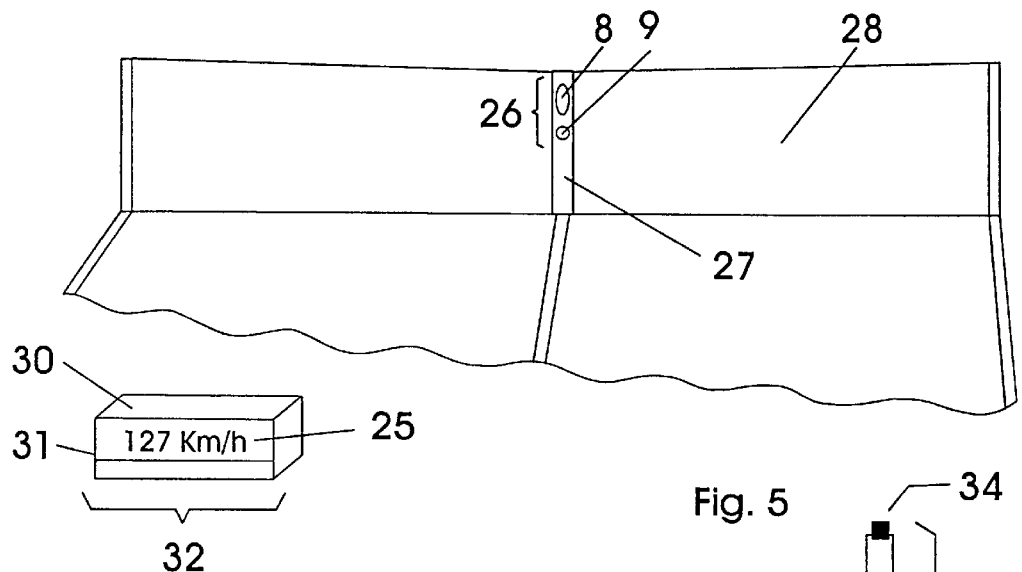

The invention is explained in the following schematics, as follows:

FIG. 1a Frontal view of the prototype of the suggested velocity-measuring device;

FIG. 1b Rear view of the velocity-measuring device ref. FIG. 1a;

FIG. 1c Side view of the velocity-measuring device ref. FIG. 1a;

FIG. 2a Frontal view of the second prototype of the suggested velocity-measuring device;

FIG. 2b Rear view of the velocity-measuring device ref. FIG. 2a ;

FIG. 2c Side view of the velocity-measuring device ref. FIG. 2a ;

FIG. 3 Schematic view of the measuring layout during usage of the suggested velocity-measuring device;

FIG. 4 Perspective part-view of a velocity-measuring device installed at a tennis net.

Figure 5:
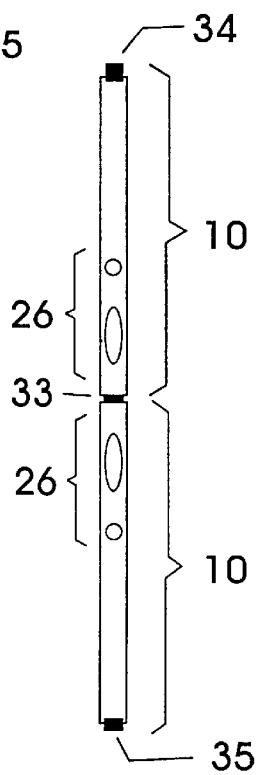

FIG. 5 Top view of a further prototype of a velocity-measuring device with several ancillary units.

Figure 6:
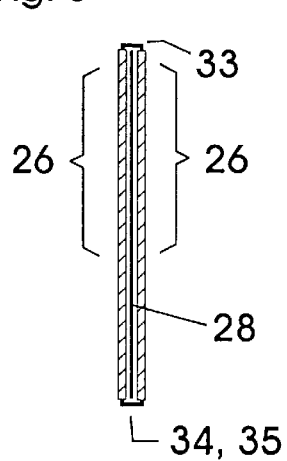

FIG. 6 Side view of the velocity-measuring device ref. FIG. 5 in position around a tennis net.

Figure 7:
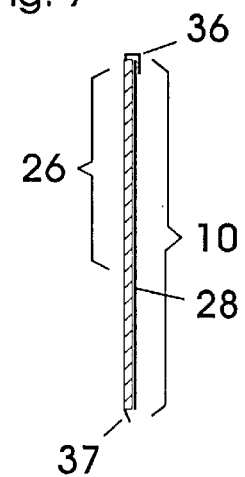
Figure 8:
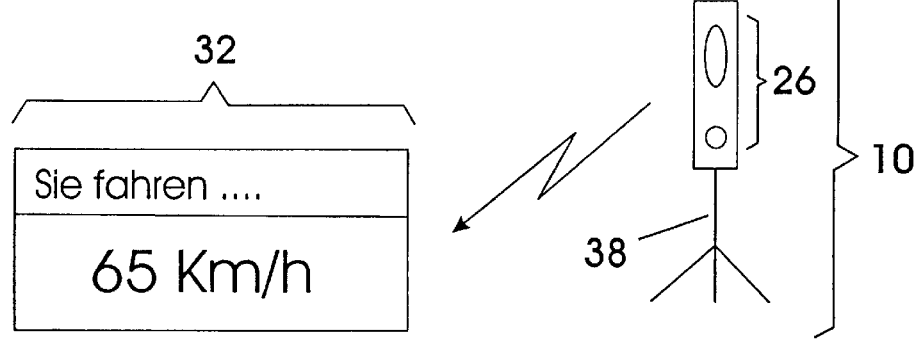

FIG. 7 Side view of a further prototype of the velocity-measuring device with a single unit for placement at a tennis net; and FIG. 8 Frontal view of another prototype of the velocity-measuring device.

The base unit 10 of the suggested velocity-measuring device 1 in the examples FIG. 1a through 2c is square in form (13), between 160 and 180 cm high, 50 to 70 cm wide, and 160 to 180 cm long. It possesses a pedestal (11) in form of a blunted pyramid spreading in the direction of the ground. Four rolls (12) project from the bottom side of the device, one at each corner of the pedestal. The body of the device (13) contains the sound wave emitter (8), sound wave receiver (9), the calculating unit (21), and a display (25); see FIG. 1b and 2c. The base unit 10 is shown with eight sound wave emitters (8) in the form of loudspeakers and a single sound wave receiver (9) in the form of a microphone. The loudspeakers (8) and the microphone (9) are placed on the frontal upper side (14) of the unit (13)—ref. FIG. 1a and 2a. The microphone (9) is placed in the centre of the front face (14) of the unit. The first group of four loudspeakers (8) is placed above the microphone (9), whereas the second group of four (8) is placed underneath the microphone (9).

On the side (15) of the unit (13) may be seen a number of square plates (16) which are designed to carry advertisements and may be removed (cmpr. FIG. 1c and 2c). In the shown example, a plate (16) is as long as the unit (13). Its height corresponds to cca. 20% of unit height, so that the unit wall (15) may hold five plates (16). The plates (16) may also be screwed onto the unit (13), but other solutions are possible. Another, smaller variation of the unit (13) has also been designed that does not include the possibility of plate attachment.

Command and display unit (17) in the shown example occupies the upper part of the unit (10).

A first prototype of the command—and display unit (17) comprises a low, rectangular unit (18) which length and width fit the length and width of the base unit (10)—FIG. 1a to 1c. The rear of the upper front side (19) of the unit (18) holds a command table (20) with a small, preliminary display screen (21), several command buttons (22) and a main switch (23)—FIG. 1b. The display unit (21) displays the measured velocity. One of the command buttons (22) resets the velocity-measuring device (1). The main switch (23) turns the device on and off.

A second prototype of the command—and display unit (17) comprises a tall, rectangular unit (18) which length and width also fit the length and width of the unit (13) of the base unit (10). On the example shown the length and width of the unit (18) are approximately the same as those of the command—and display unit (17)—FIG. 2a, 2b. The rear of the upper front side (19) of the unit (18) also has a command table (20) arranged in the same way as that of the first prototype command—and display unit (17). In addition to the small, preliminary display screen (21) of the command table (20) the command—and display unit (17) of the second prototype has a second, larger display (25) on at least one side of the unit (24)—FIG. 2c.

A more developed prototype of the suggested velocity-measuring device (1) is equipped with microprocessors and a radio remote control. It is also possible to connect the velocity-measuring device (1) onto a personal computer. Using a personal computer a user will be able to display and arrange the speed results with more facility, separating data into various testing persons' folders, etc.

The measurement of an object's (4) velocity foresees the placement of the suggested device (1) to one side of the predicted line of movement (3) of the object (4). The emitted sound waves (2) and the line of movement (3) must intercept each other within the detection zone (6) under an acute angle α (FIG. 3). The shape and size of the detection zone (6) depend on the output power of the emitter and the sensitivity of the microphone (9) as well as the placement angle of the loudspeakers (8).

As soon as the velocity-measuring device (1) is turned on it emits sound waves (2) via the loudspeakers (8). The frequency of the sound waves is not significant, but it is perhaps most convenient to choose frequencies beyond the human auditory range. The chosen frequencies may also lie in the domain of ultrasound, that is, exceeding 20 kHz.

The emitted sound waves (2) move in the direction of the anticipated line of movement (3) of the followed object (4) and intercept the line (3) at the crossover point (5). During the time in which the followed object (4) moves within the detection zone (6) it reflects the sound waves (2) which strike it. A fraction of the reflected sound waves (7) returns to the velocity-measuring device (1) and is received by the microphone (9). Receiving as such is a selective process—at the emitting frequency of cca. 21 kHz the received echo may have a frequency between 16 and 29 kHz, excluding the unwanted noise from the detection process. Further refinements are achieved by pulsing, coding, or modulating the sound waves (2). The various types of modulation are yet another way of noise reduction. The microphone (9) transforms the sound waves into electronic signals and forwards these to the computing unit.

The movement of the object (4) modifies the wavelength of the reflected sound waves (7). The wavelength increases when the object (4) moves away from the velocity-measuring device (1), whereas the frequency decreases. The wavelength decreases when the object (4) moves towards the velocity-measuring device (1) and the frequency increases. The difference between the emitting frequency and the frequency of the echo provides a means for measuring the velocity of the object (4)—the greater the difference, the higher the velocity.

The computing unit analyses the signals incoming through the microphone (9), noting the difference between the emitting and echo frequencies and computing the speed of the followed object (4). Several measurements may be made during the followed object's (4) passage through the detection zone (6)—for example, the greatest speed out of the measured selection shall be finally displayed. Another possibility is finding the median value of the measured velocities. The found velocity shall be shown at the display screen (21) or (21, 25) as the case may be.

The shown example (FIG. 3) has the velocity-measuring device (1) in a stationary position, whereas the object (4) moves. However, it is also possible to set up a measuring situation in which the velocity-measuring device (1) moves while the object is stationary.

Another prototype of the invention shown in FIG. 4 has the components of the base unit (10) partially separated and placed at a variety of positions. Firstly, this concerns the sound wave emitter (8) and the sound wave receiver (9) which, combined into an emitting-receiving unit (26) in the shown example comprise the middle part (27) of a tennis net (28) or are integrated into it. Secondly, the computing unit (30) together with the display screen (25) is placed apart from the emitting-receiving unit (26) in a casing (31) next to the field. In this example, the computing unit (30) and the display screen (25) comprise a computing-display unit (32).

In the shown example (FIG. 4), the data containing the measured velocity is sent to the computing unit (30) via radio. It would also be possible to utilise a cable connection (not shown) for the transfer of data.

The base unit (10) in the shown example is therefore separated into an emitting-receiving unit (26) and a computing-display unit (32).

A further elaboration of the example shown (FIG. 4) is schematically shown in the following example (FIG. 5). Two base units (10) are interconnected via a schematically indicated hinge (33). Note that the example shows only two emitting-receiving units (26) of the base units (10). At one end, shown on the right side in FIG. 5, there is a clasp (34) fastening the base unit under the net, whereas its counterpart (35) sits on the opposite side.

FIG. 6 shows the interconnected emitting-receiving units (26) from one side, whereby one of the emitting-receiving units (26) stands on one side of the tennis net (28) and its counterpart (26) stands on the other side of the net (28). Both emitting-receiving units are connected on their upper part (FIG. 6) via the hinge (33), and via the clasp (34) and the counterpart (35) on the other side, thus fastening them to the net (28). Ideally, the emitting-receiving units (26) constitute the middle part (27) of the tennis net (28), as shown in FIG. 4.

In the example shown in FIG. 6 two base units (10) are set up to measure the velocity of a tennis ball in such a way that the detection zones (6—not shown) face each other, covering various parts of the field without overlapping. It is clear that the sound wave emitter (8) and the appropriate sound wave receiver (9) of the base unit (10) are to be integrated or built into the middle part (27) of the tennis net (28)—FIGS. 4, 6.

In the example shown in FIG. 6 the velocity of the tennis ball struck from one part of the field into another is measured twice—once as the ball moves towards the first base unit (10) facing the player, the second time as it moves away from the base unit (10) facing away from the player. In the first case (emitting-receiving unit facing the player) the angle between the created sound wave and the flight pattern of the ball is usually obtuse, whereas in the second case (emitting-receiving unit facing away from the player) the angle α shown in FIG. 3 tends to be acute. As already mentioned, the computing-display unit in the abovementioned example should be placed next to the field. Naturally, the velocity-measuring device may also be positioned in such a way that the ball velocity may be examined and displayed from only one side of the playing field.

FIG. 7 is a side view of a part of the base unit (10)—that is, the emitting-receiving unit (26). In this prototype a base unit (10) is also connected to the tennis net (28) via a U-shaped clasp (36); the bottom part of the unit also has a clasp (38)—e.g. a snap hook. In the interests of clarity this clasp is hinted at schematically. Obviously, the part of base unit (10) shown in FIG. 7 may also be attached to a tennis wall where one or several players may be training.

A further prototype is shown on FIG. 8 and intended for usage in street traffic control base unit (10), as seen previously, consists of an emitting-receiving unit (26) stood on a pedestal (38) on a street, whereby the separately set up computing-display unit (32) shows the measured velocity of the vehicles. In this way the suggested velocity-measuring device may also be used by traffic control officers.

The velocity-measuring device (1) may operate independently from the power system, preferably via an accumulator placed within the base unit (10). The base unit (10) has an attachment permitting the constant control of the accumulator power levels. Should the accumulator energy fall to levels at which the velocity-measuring device may only operate fur further 30 minutes a warning message "LOW BATTERY" shall appear at the optical display (21). Accumulator recharging may be done without removing the accumulator from the base unit (10), as access is provided for the charging device. It goes without saying that the velocity-measuring device may also be connected to the power system.

The suggested device (1) is suitable for the measuring of velocity of a variety of targets. A possible area usage is, as already mentioned, sport. The velocity-measuring device (1) may also be used for measuring the velocity of footballs during penalty shots, passing, etc, increasing both the control of training success and the attractiveness of a game of football. In the aforementioned example the device may be rolled out—thanks to the rolls (12) placed on the pedestal (11)—before a goal during the break. The audience and the junior players would then have the chance to shoot penalties in controlled conditions where the ball velocity is known. The advertising plates of the velocity-measuring device (1) would be particularly effective in these circumstances.

The suggested prototype of the velocity-measuring device (1) demonstrates a variety of superior attributes in direct comparison with similar known devices.

Devices operating on the principle of light barriers must have large measuring frames, whereas the suggested device (1) requires no such cumbersome constructions and may be used without prior preparation, simply placing it sideways to the expected line of movement (3) of the followed object (4). The simple construction of the device guarantees significantly lower prices than those attached to the light barrier devices.

Even though the retail price of the suggested velocity-measuring device (1) lies significantly below the prices of the Doppler-effect radar devices, it demonstrably displays the same utility and shows measurement results of same exactness. The production costs are lower to such a high extent because the sound wave creation, emission, and detection instruments tend to be much smaller and less expensive than the appropriate radar ones.

A telling fact is that the usage of the velocity-measuring device (1) during shot distance football training delivers more exact results—and in a shorter time—than any other device.

In conclusion, it may be said that the suggested velocity-measuring device (1) displays remarkable practicality and cost-effectiveness. The device is capable of measuring and evaluating the velocity of a variety of objects within its detection zone (6). Thanks to these advantages it will be received with much interest on the market.

What is claimed is:

1. A velocity-measuring device for tracking an object utilizing the Doppler-effect in the difference between the frequencies sent by a sound wave emitter having an emitting frequency, and the frequency of the sound waves received by a sound wave receiver having an echo frequency, comprising a sound wave emitter, a sound wave receiver, and a computing unit, contained within a base unit, a loudspeaker for each sound wave emitter and a microphone for each sound wave receiver, wherein the sound waves and the object line of movement intersect each other within a detection zone in an acute or obtuse angle (α) wherein the base unit has an upper front side centrally positioning the sound wave receiver, a first group of sequentially position sound wave emitters above, and a second group of sequentially positioned sound wave emitters below.

2. A velocity-measuring device, in accordance with claim 1, having a display showing the detected velocity.

3. A velocity-measuring device, according to claims 1 or 2, in which the placement of the part components of the base unit within a single casing or spatially positioned separately from each other.

4. A velocity-measuring device, according to claim 1, including an emitting-receiving unit and a computing unit and a display screen comprising a computing-display unit separate from the emitting-receiving unit.

5. A velocity-measuring device, according to claim 1, in which there is provided a rectangular case control-display unit rear front side having a control table and a display screen, including control buttons and a main switch on the base unit.

6. A velocity-measuring device, according to claim 5, including a large, secondary display screen on one side of the command-display unit casing in addition to the first display screen of the control table.

7. A velocity-measuring device for tracking an object utilizing the Doppler-effect in the difference between the frequencies sent by a sound wave emitter having an emitting frequency, and the frequency of the sound waves received by a sound wave receiver having an echo frequency, comprising a sound wave emitter, a sound wave receiver, and a computing unit, contained within a base unit, a loudspeaker for each sound wave emitter and a microphone for each sound wave receiver, wherein the sound waves and the object line of movement intersect each other within a detection zone in an acute or obtuse angle (α), further comprising an emitting-receiving unit and a computing unit and a display screen comprising a computing-display unit separate from the emitting-receiving unit, wherein a plurality of base units are used for measurement of ball velocities in games using a net in such a way that the detection zones of the base units do not intersect and preferably cover different halves of the playing field.

8. A velocity-measuring device, according to claim 7 in which data consisting of detected velocity measurements may be transmitted to the computing unit either via radio link or cable.

9. A velocity-measuring device, according to claim 7 comprising at least one sound wave emitter and at least one sound wave receiver in the middle part of a tennis net.

10. A velocity-measuring device, according to claim 7 in which the sound wave emitter produces an emitting frequency beyond the human auditory range, preferably within the ultrasound zone exceeding 20 kHz.

11. A velocity-measuring device, according to claim 7 in which there is selective receiving of reflected sound waves falling between 16 and 29 kHz at an emitting frequency of 21 kHz.

12. A velocity-measuring device, according to claim 7 in which the emission of sound waves is one of pulse, code and modulated.

* * * * *